Oct. 27, 1925. 1,559,499
C. O. BRANDELL
PROCESS AND MACHINE FOR MAKING TILE
Filed Jan. 30, 1922 10 Sheets-Sheet 1
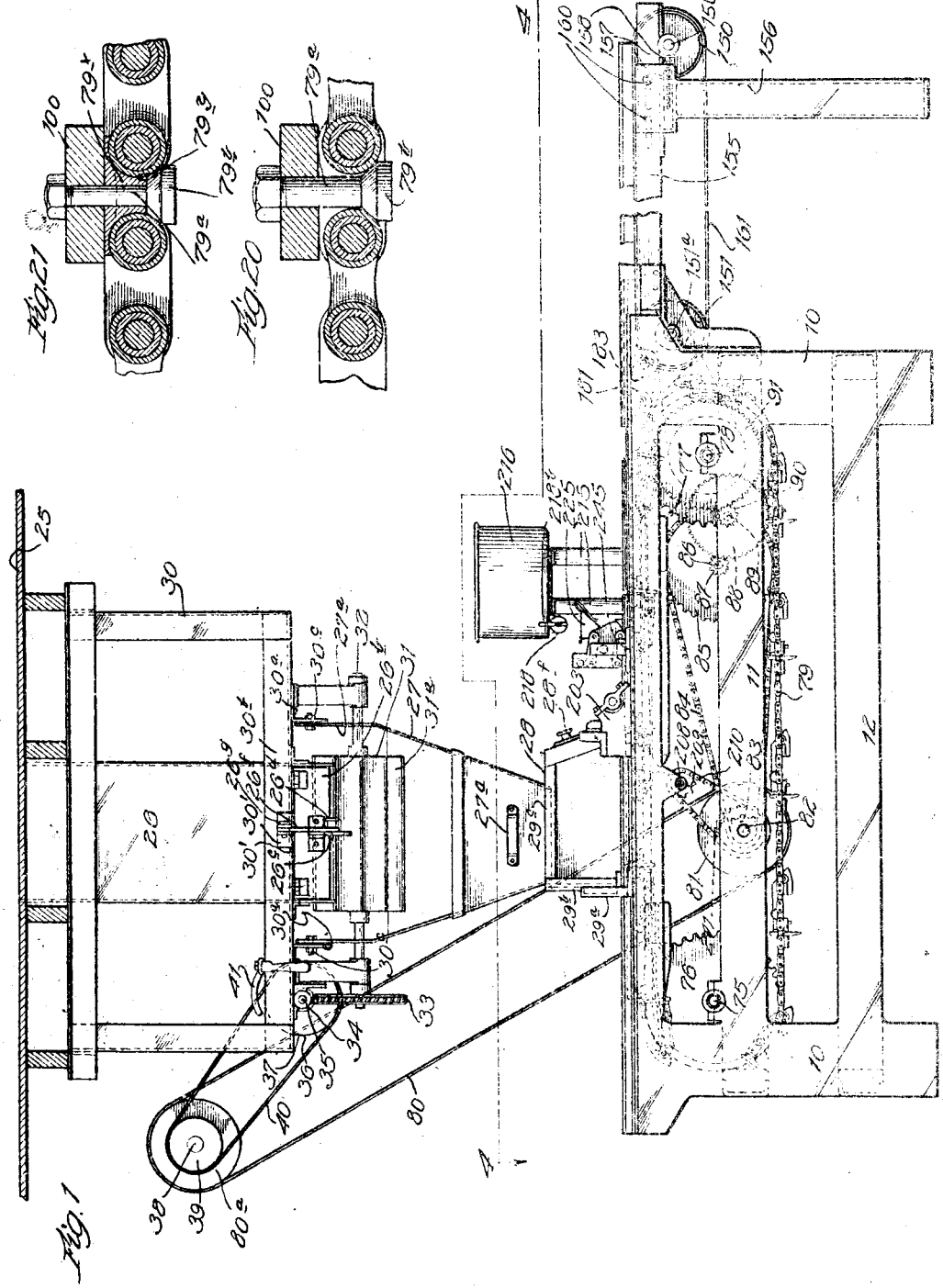
Inventor
Claus O. Brandell
By Sheridan Jones Sheridan & Smith
Attys Oct. 27, 1925.
C. O. BRANDELL
1,559,499
PROCESS AND MACHINE FOR MAKING TILE
Filed Jan. 30, 1922   10 Sheets-Sheet 2
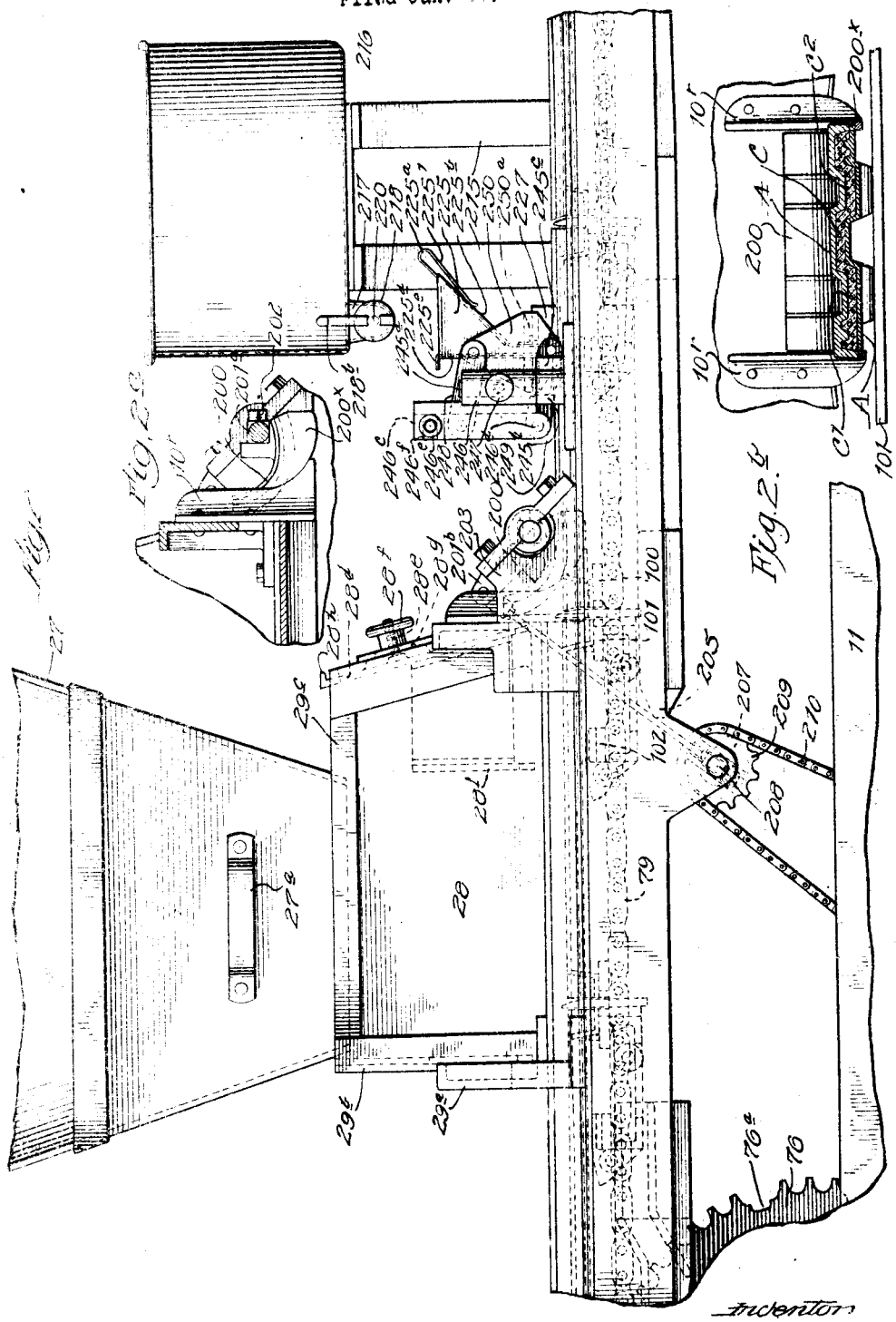
Inventor
Claus O. Brandell
By Sheridan, Jones, Sheridan & Smith, Attys.

Oct. 27, 1925.
C. O. BRANDELL
1,559,499
PROCESS AND MACHINE FOR MAKING TILE
Filed Jan. 30, 1922  10 Sheets-Sheet 3
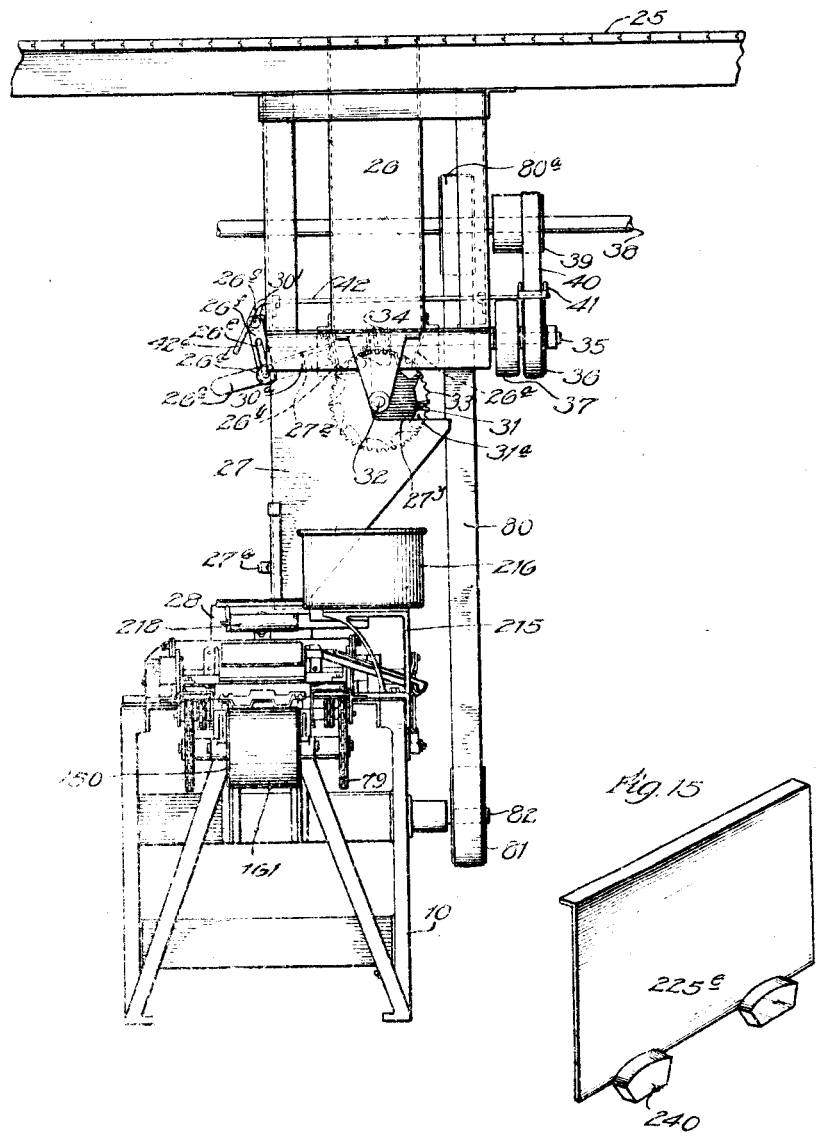

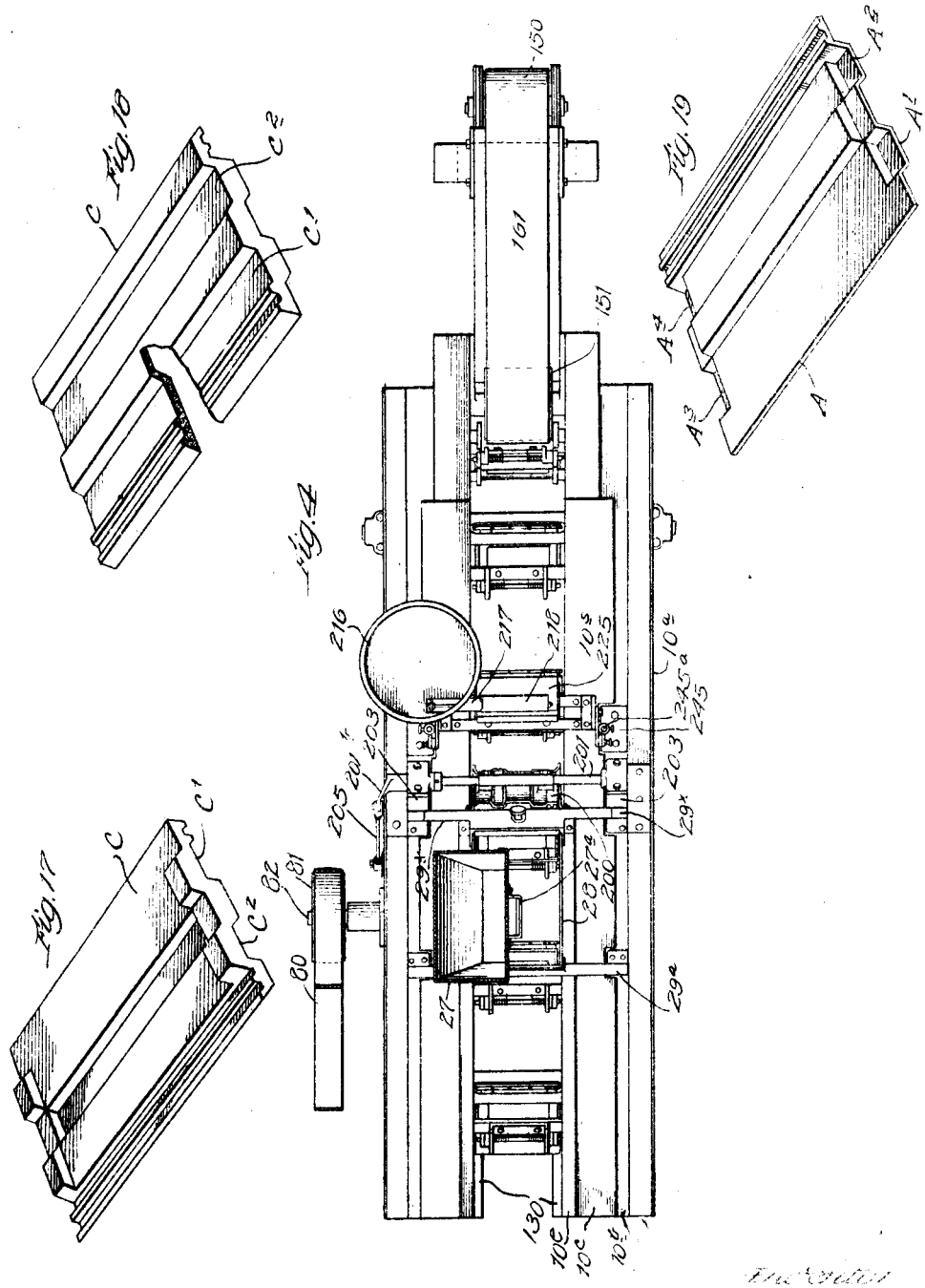

Oct. 27, 1925. 1,559,499
C. O. BRANDELL
PROCESS AND MACHINE FOR MAKING TILE
Filed Jan. 30, 1922 10 Sheets-Sheet 5
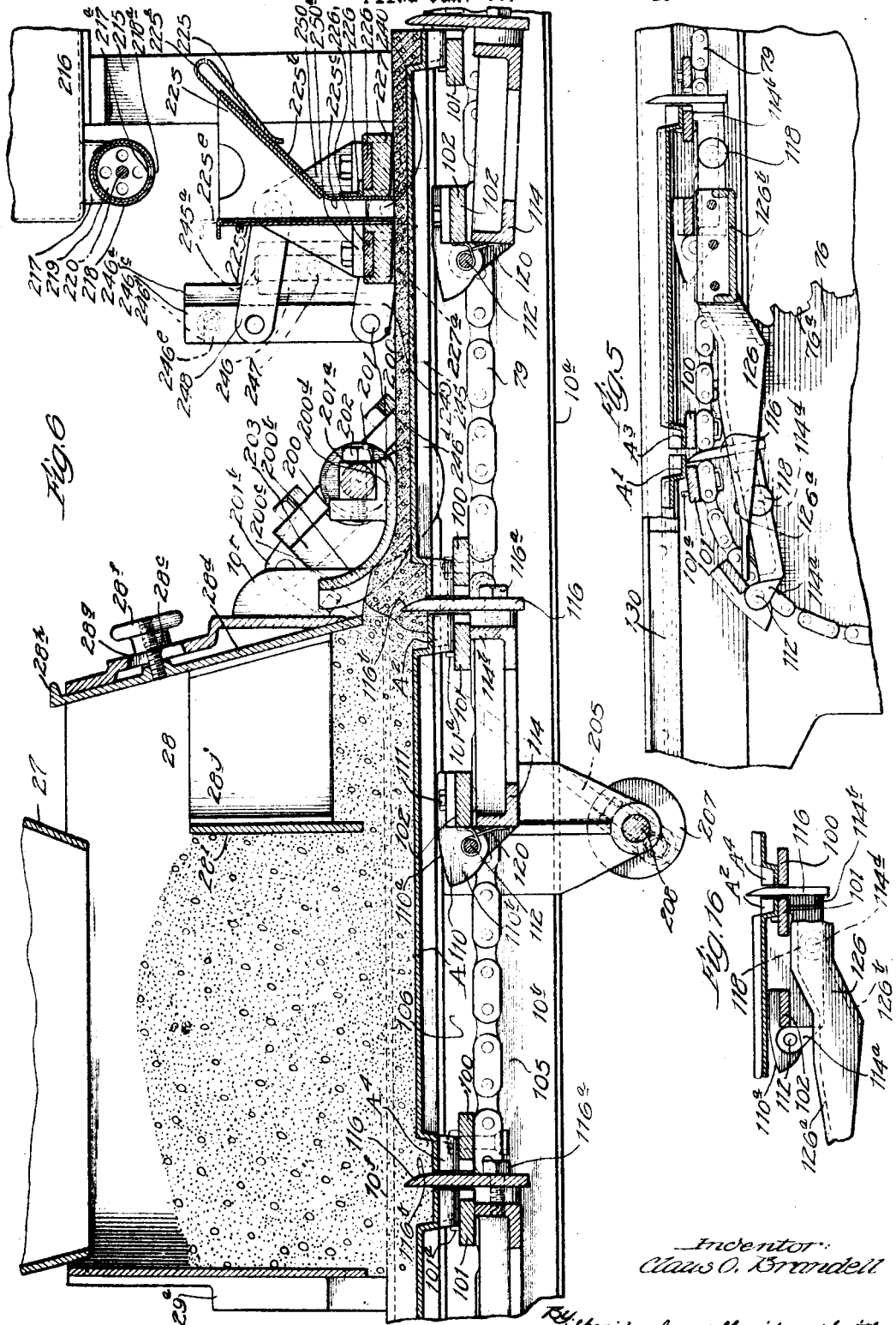
Inventor
Claus O. Brandell
By Sheridan, Jones, Sheridan & Smith, attys.

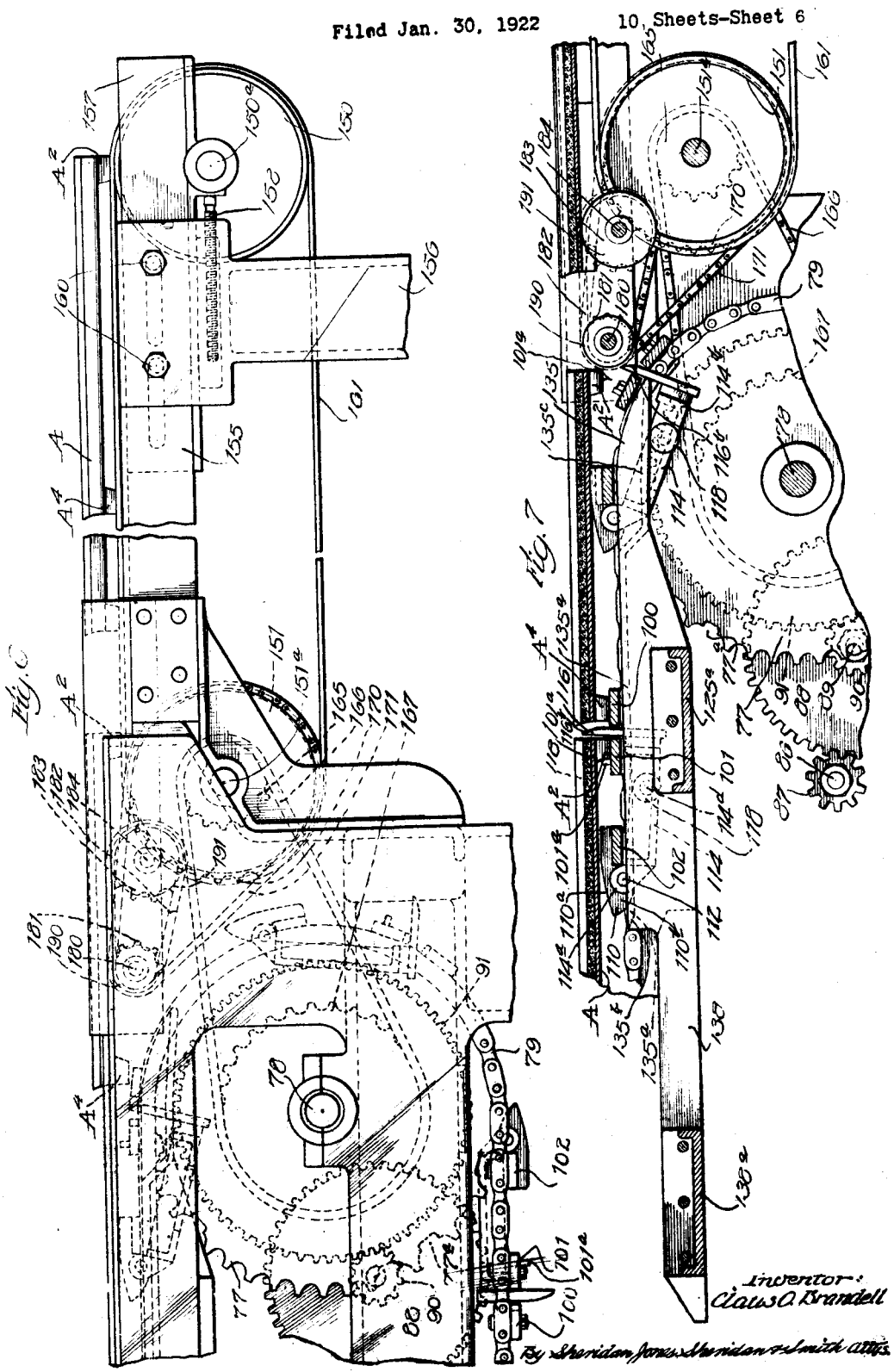

Oct. 27, 1925. 1,559,499
C. O. BRANDELL
PROCESS AND MACHINE FOR MAKING TILE
Filed Jan. 30, 1922 10 Sheets-Sheet 7

Inventor
Claus O. Brandell
By Sheridan Jones Sheridan & Lewis
attys

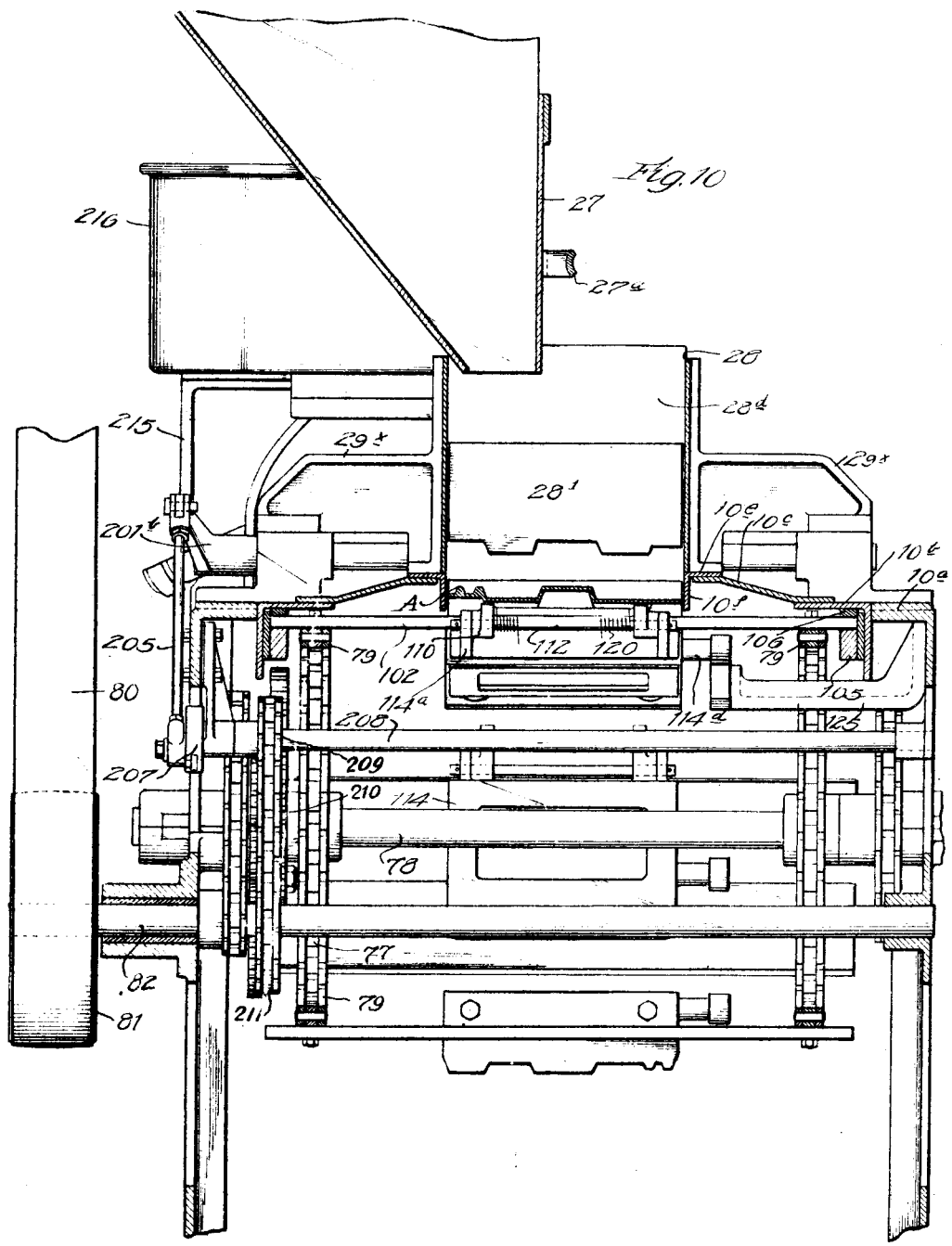

Oct. 27, 1925.
C. O. BRANDELL
1,559,499
PROCESS AND MACHINE FOR MAKING TILE
Filed Jan. 30, 1922  10 Sheets-Sheet 9
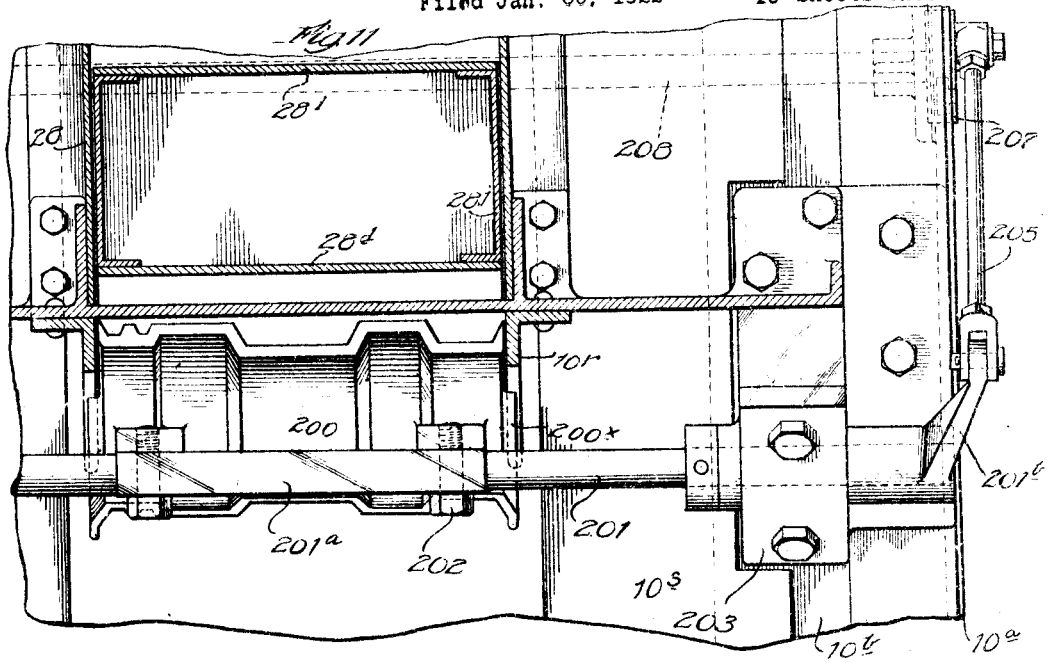
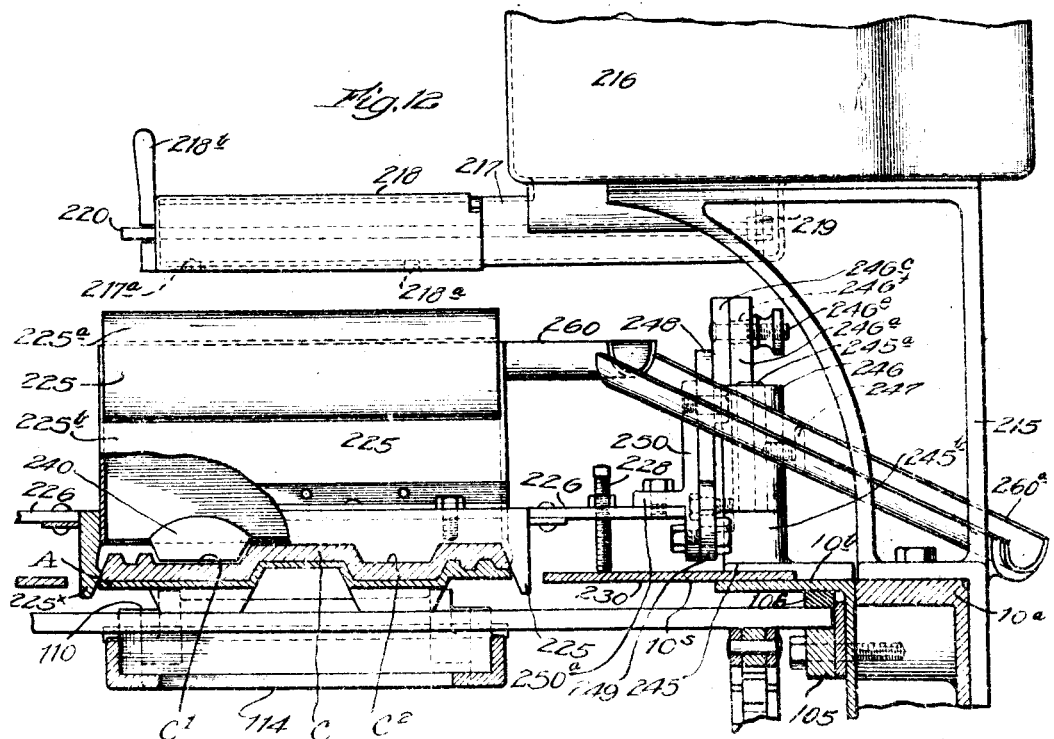

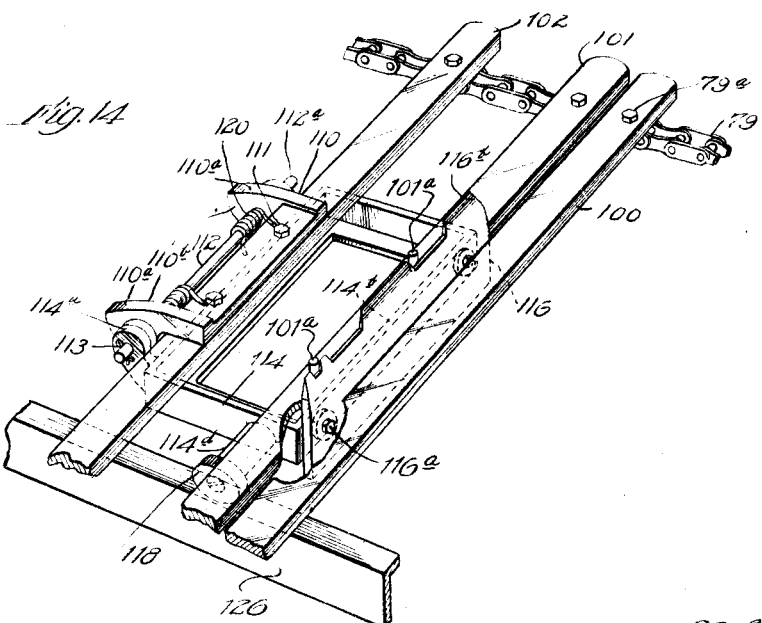

Patented Oct. 27, 1925.

1,559,499

UNITED STATES PATENT OFFICE.

CLAUS O. BRANDELL, OF CHICAGO, ILLINOIS, ASSIGNOR OF ONE-HALF TO CARL A. CARLSON, OF CICERO, ILLINOIS.

PROCESS AND MACHINE FOR MAKING TILE.

Application filed January 30, 1922. Serial No. 532,534.

*To all whom it may concern:*

Be it known that I, CLAUS O. BRANDELL, a citizen of the United States, residing at Chicago, in the county of Cook and State of Illinois, have invented certain new and useful Improvements in Processes and Machines for Making Tile, of which the following is a specification.

This invention relates to improvements in processes and machines for making tile and has for an object to provide a mechanism of that character in which the aggregate of desirable consistency may be delivered upon the pallet boards, the latter being conveyed beneath the charging point.

Another object consists in the arrangement and means for tamping and smoothing charges upon the pallet boards to the size and standard required.

Another object consists in the prevention of jamming or crowding of the aggregate while the pallet boards are receiving their charge and during the subsequent tamping.

Another object consists in the provision of new and improved means for applying a coating of coloring material or the like to the formed tile.

Another object consists in the provision of new and improved separating means for separating each pallet and its tile from the succeeding pallets prior to the discharge from the machine.

Still another object consists in the provision of means to receive the pallet boards and tile from the machine proper and convey them away to any suitable collection point without interfering with the backing up of succeeding pallets and tile.

These and other objects will be more fully explained and described in the following specification and shown in the accompanying drawings, in which—

Figure 1 is a side elevation of my machine.

Fig. 2 is a side elevation of a portion thereof drawn to an enlarged scale.

Figure 9:
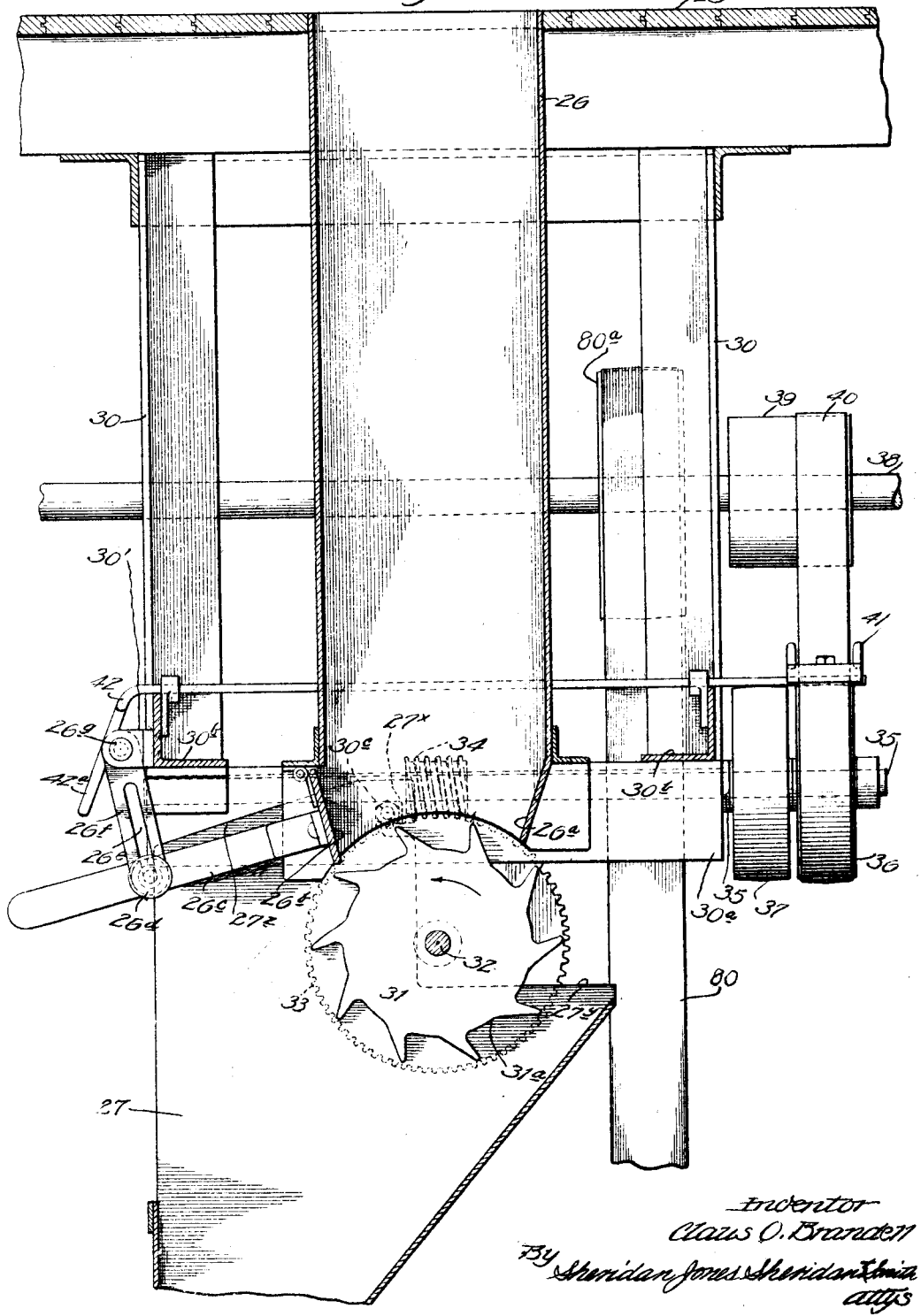

Fig. 2ª is a side elevation of the tamping member and adjacent side plates.

Fig. 2ᵇ is a horizontal and vertical section through the tamping member showing the relation to the pallet and tile, the section being taken forwardly of the center of rotation of the tamping member.

Fig. 3 is an end elevation of the same viewed from the discharge end.

Fig. 4 is a horizontal section taken along the line 4—4 of Fig. 1.

Fig. 5 is a vertical longitudinal section of a portion of the machine showing the pickup and positioning of the empty pallets.

Fig. 6 is a vertical longitudinal section through the charging hopper, tamping mechanism and coloring mechanism.

Fig. 7 is a view similar to Fig. 5 showing the discharge end of the machine and delivery to the take-off conveyor.

Fig. 8 is a view similar to Fig. 7 save that the parts are shown in elevation, showing the discharge receiving or take-off conveyor.

Fig. 9 is a vertical transverse section through the aggregate bin, feed roller and receiving funnel.

Fig. 10 is a vertical transverse section through the body of the machine, receiving hopper, etc. looking toward the rear of the machine.

Fig. 11 is a horizontal section through the charging hopper above the body of the table.

Fig. 12 is a vertical transverse section through the table at the rear of the coloring mechanism and looking toward the front of the machine.

Fig. 13 is a perspective of a portion of the coloring mechanism.

Fig. 14 is a perspective of a portion of the pallet conveying and supporting means.

Fig. 15 is a perspective of the slide gate and blocks for filling the depressions of the tile during coloring.

Fig. 16 is a vertical longitudinal section showing a detail of the pallet conveying and supporting means.

Fig. 17 is a perspective of one of the tile in inverted position.

Fig. 18 is a similar perspective in normal position.

Fig. 19 is a perspective of one of the pallet boards.

Fig. 20 is a vertical transverse section through a portion of one of the chains showing the method of attachment of the cross strips upon the higher links; and Fig. 21 is a similar view showing the method of attachment of one of the strips to the lower links.

Like numerals refer to like elements throughout the drawings in which 25 indicates a floor or platform a sufficient distance above the body of the machine to permit the location of a receiving chute 26, which discharges into the bin 27 which in turn is tapered toward the bottom at which it is open for discharge into the charging hopper 28. The bin 26 is tapered at its open discharge end 26ª, one side being provided with a pivoted flap or gate 26ᵇ to which is attached and from which projects the operating handle 26ᶜ. This handle in turn is provided with a locking screw 26ᵈ having a portion projecting through the slot 26ᵉ and pivoted in the arm 26ᶠ, which in turn is pivoted at 26ᵍ, and a lug 30' carried by the member 30 of a suspending framework.

The rotatable feeding roll 31 is journaled at its extremities and is carried upon the axial shaft 32 to which is also secured the worm gear 33, meshing with the rotatable worm 34, carried upon the shaft 35. Secured to and rotating with the shaft 35 is the fast pulley 36. A loose or rotatable pulley 37 is rotatably mounted on the shaft 35. A main drive shaft 38 is provided having the drive pulley 39. A belt 40 extends from said drive pulley 39 and may be shifted either to pulley 36 or pulley 37 by means of the shift 41 and slide rod 42 having the handle 42ª. This permits in a well-known manner the driving or non-driving of the shaft 35 with the consequent rotation or non-rotation of the feed roll 31. The latter is provided with the longitudinal grooves or recesses 31ª and is adapted to closely fit the discharge opening of the chute 26. When rotating in the direction indicated by the arrow in Fig. 9, the amount of discharge from chute 26 by the roll 31 may be varied according to the position of the flap 26ᵇ, thereby permitting regulation of the discharge of aggregate into the funnel 27 and therefrom into the hopper 28.

Angle bars 30ª extend transversely of and are secured to the horizontal supporting frame members 30ᵇ carried by the vertical frame members 30, see Figs. 1-9. The funnel 27 is provided with bayonet slot 27ˣ, shown in dotted lines in Fig. 9, for example, which permits engagement with the studs 30ᶜ carried by the angle bars 30ª, see Figs. 1-9. The inner ends of the slots 27ˣ are preferably located substantially in a vertical plane through the center of the funnel 27, and the sides of the latter are cut away as indicated at 27ʸ.

Also the upper side edges of the hopper 27 are inclined downwardly and rearwardly as indicated by numeral 27ᶻ. This construction permits the swinging of the funnel 27 outwardly at the studs 30ᶜ until the discharge end of the hopper is at one side of the charging box 28 so as to discharge the aggregate on the floor away from the machine, should this become desirable. Also by the use of the handle 27ª the funnel may be shaken to clear any aggregate which may lodge therein. There is sufficient clearance between the top of the funnel 27 and the supporting frame to permit its being lifted or moved transversely for removal and vice versa for replacement.

The charging hopper 28 is carried between and by vertical uprights 29ª and is provided with reinforcing members 29ᵇ at the front corners across reinforcing strips 29ᶜ. The rear end of the box 28 is inclined downwardly and rearwardly from the top and is provided with the feed gate 28ᵈ located on the inner face. This gate is provided with a locking screw 28ᵉ having a threaded handle 28ᶠ, the screw extending through the slot 28ᵍ in the rear wall of the box 28. Operation of the screw and handle will permit the sliding of the gate upwardly or downwardly and subsequent locking in adjusted position. The gate 28ᵈ is provided with an overlying upper flange 28ʰ to prevent its dropping downwardly to interfere with the pallets. Carried at the inner face of the gate 28ᵈ is the frame 28ⁱ extending between the side walls of the box 28, and attached to the front wall of the frame 28ⁱ is the partition 28ʲ acting as a dam or baffle, its purpose to be hereinafter described.

The machine proper comprises vertical standards or legs 10, with frame members 11—12 extending therebetween, see Fig. 1. Extending longitudinally of the machine are the side table portions 10ª, adjacent which are the parallel strips 10ᵇ, the legs 10, portions 10ª and sides 11 and 12 forming side frame members. Extending upwardly and inwardly from the strips 10ᵇ are the sheets 10ᶜ upon which are carried the angle bars 10ᵈ, which terminate at the rear end of the hopper, the depending faces 10ᵉ of these angle bars constituting spaced guides for the pallets while passing beneath the hopper. (See Fig. 10). Side plates 10ᶠ are located at the sides of the charging box 28 at either side of the tamping member 200, and lie close to the sides of such member to confine the aggregate as it is being tamped. The lower portions of these side plates 10ᶠ are curved, as shown in Fig. 2ª, to substantially prevent leakage of the material while being tamped.

Rearwardly of the charging box 28 the side plates 10ᵍ are provided which protect the chain, sprockets and other moving parts from the aggregate, coloring material, and the like, see Fig. 4 and 13.

The standards 29ª extend upwardly from and are secured to the table portions 10ª, 10ᵇ. Similar standards or pedestals 29ˣ are attached to the rear wall of the box 28, see Fig. 4, for example.

Journaled in the side frames is a shaft 75, see Fig. 1, carrying sprockets 76. A pair of these sprockets is provided located on each side of the machine. A pair of drive sprockets 77 are provided at the rear of the machine and carried by the shaft 78, likewise journaled between the side frames of the machine. A pair of conveyor chains 79 extend around the sprockets.

Movement is imparted to these chains by the mechanism shown for example in Fig. 1, wherein a belt 80 driven by pulley 80ª and shaft 38, partially surrounds and rotates pully 81 carried on shaft 82, which in turn carries a sprocket 83. A chain 84 extends from around the sprocket 83 to and around the sprocket 85 which in turn is carried on the shaft 86, carrying pinion 87, which in turn rotates gear 88, thereby rotating shaft 89 and pinion 90, which latter rotates the gear 91 carried on shaft 78, see Figs. 7 and 8.

Extending across the chains 79 are the supporting strips 100, 101 and 102, see Figs. 6–14 for example. These strips are arranged in sets of three, as shown in Fig. 14, with a relatively slight gap between the pairs of pallet supporting strips 100 and 101 to permit the movement therebetween of a separating member. The strips 102 are provided for carriage of the separating members. These sets of strips are arranged in such wise that a pallet A, (see Fig. 19), provided with depending recessed lugs or bosses $A_1$, $A_2$, $A_3$, and $A_4$ will extend between and be supported upon the strips 100 and 101, see Figs. 5 and 6, with the foremost lugs $A_1$, $A_2$, supported upon strips 101 and the rear lugs $A_3$, $A_4$ upon strips 100. Strips 101 are provided with pins 101ª, see Fig. 5, which engage and pick up the lugs $A_1$, $A_2$ to move the pallet with the conveying mechanism and to properly position it with respect to the other pallets passing through the machine.

In attaching the cross strips 100, 101, and 102 to the chains the standard construction of the chains has been taken into consideration. In these chains some of the links have sides which are lower than the adjacent link sides and inasmuch as the cross strips must be maintained in a horizontal plane in conveying the pallet boards, it is necessary to compensate for the difference in height of the link sides. In Fig. 20 I have illustrated the method of attachment to the high side links wherein a bolt 79ª having the chamfered head 79ᵇ is inserted between a pair of link pins and through one of the cross strips 100. This permits a secure attachment of the strip.

In Fig. 21 I have shown the means of attachment for the low side links wherein a filler block 79ˣ is placed between a pair of link sides with its upper surface on a plane with the upper surface of the high link sides, a depending angle 79ʸ extending downwardly between the link ends. In this construction the bolts 79ª extend through the filler blocks 79ˣ and strips 100 being slightly reduced in diameter for obvious reasons.

To accommodate the heads 79ᵇ of the bolts 79ª certain teeth of the sprockets 76 are cut away at 76ª, as illustrated in Fig. 5, for example, while certain of the sprockets 77 are cut away as indicated at 77ª, see Fig. 7 for example. By properly selecting the chain and constructing the sprockets 76—77 with the proper number of teeth, the cut away portions will always aline with the bolt heads during operation of the conveying mechanism as will be apparent.

The ends of the strips 100, 101, 102 extend outwardly to the chains 79 and during a portion of their travel in their upper run these ends ride between strips 105—106 carried on the inner side of table strips 10ᵇ, see Figs. 10 and 12. This provides support for the pallets during the charging, tamping and troweling of the tile.

Carried by each of the strips 102 is the bracket 110 having the upper cam surfaces 110ª on the spaced apart lugs 110ᵇ, see Fig. 14 for example, this bracket 110 being secured by machine screws 111, or the like, to the strip 102.

Extending between and through the lugs 110ᵇ is the rod 112 having enlarged head 112ª at one end, being provided with removable cotter pin 113 at the other to prevent its accidental detachment. Journaled upon the rod 112 are the ears 114ª of the frame 114 which extends beneath the strips 101—102. At its front side 114ᵇ is secured a separating blade 116 by means of bolts 116ª, see also Fig. 6, for example. These blades are provided with the tapered edge 116ᵇ and are of such thickness as to pass readily into and out of the gap between strips 100 and 101. The separating blades 116 are formed as shown with the rear face plane and the front face in the direction of travel curved to the upper edge. The pivotal point of the frame 114 and blades 116 is below the plane of travel of the pallets and as the blades are moved from separating position after finishing of the tile, the plane surface of the blade will be moved downwardly on the front end of the tile and gradually away from the same, thus affording a gradual withdrawal of the blade from the tile so as to leave a square front end on the tile and not dislodge or draw particles of the tile away by suction, as would be the case were the separating member moved abruptly away from the tile. The arc of the curved portion of the front face of the blades is of less radius than the radius of the arcuate travel and this effects a clearing of the blade from the end of the preceding tile, the tile commencing its acceleration at or about the same time, as previously described. It is also to be noted that the edge provided at the upper portion of the blade by this construction is a meritorious feature of my invention, as, the same being closely adjacent to the troweling and tamping members during passage therebeneath, the possibility of small stones or gravel being wedged between the separating members and the tamping member or trowel is practically obviated, together with the consequent danger to the mechanism and tile. The resultant inclined rear end of the tile is no objection, as this is the end of the tile which is covered in roof construction. The separating blades 116, as shown in Figure 14, have their upper edges 116ᵇ cut away to conform to the contour of the tamping member and troweling blocks so as to prevent interference therebetween. From one side of the frame 114 extends the arm 114ᵈ at the end of which is provided rotatable roller 118. Coiled springs 120 are located around the rod 112 with one end pressing against the strip 102, the other end against the rear of the frame 114, see Fig. 6, these springs serving to normally maintain the frame in position with its wall 114ᵇ contacting with the lower side of strip 101 in which position the separating blade 116 is in its uppermost or separating position.

Secured to the inner face of one of the side frames is the bracket 125 projecting beneath the adjacent chain 79, as shown in Fig. 10. At its inner portion the bracket 125 carries the cam plate 126 see Figs. 5–16 for example. This cam plate 126 is provided with an upper flange 126ᵃ and a lower flange 126ᵇ, space being provided between these flanges for the passage of the roller 118. It will be noted that this cam plate 126 is located adjacent the front sprocket 76 and it is so arranged that as each separating blade 116, and frame 114 are approaching the table of the machine from beneath, roller 118 will engage the forward projection or flange 126ᵃ, which is so arranged as to maintain the separating blade 116 in retracted position. This is to prevent interference with the pallets waiting to be picked up, as illustrated in Fig. 5, these pallets being fed to the machine by hand or otherwise on the tracks or guides 130. The springs 120 serve to maintain the roller 118 normally in contact with the flange 126ᵃ which is further constructed to permit the rise or advance of the blade 116 after engagement of the pallet lugs A₁, A₂ by the pins 101ᵃ. In other words, as pallets are fed to position for picking up by the conveying mechanism, friction will maintain them stationary until pins 101ᵃ engage the lugs at which time each pallet is properly spaced from the preceding pallet as shown in Fig. 16 for example. As stated, the upper cam flange 126ᵃ permits gradual rise or lift of the separating blades 116 after the pallets have been properly positioned. The lower cam flange 126ᵇ is provided to positively move the separating blade to separating position in the event the action of the springs is not strong enough.

Similarly adjacent sprocket 77 is provided a cam plate 135, see Fig. 7. having the extended upper cam flange 135ᵃ provided with tapered edge 135ᵇ at the front as indicated in dotted lines in Fig. 7. This flange is provided with a depressed or offset portion 135ᶜ at the rear, and its function, as illustrated in Fig. 7, is to depress the frames 114 and blades 116 through the rollers 118. This depression is relatively slight, being substantially the thickness of the flange 135ᵃ, until the offset portion 135ᶜ is reached, which is the beginning of the rounding of sprockets 77 by the strips at which point it is necessary to further depress the separating blades 116 to permit uninterrupted discharge of the loaded pallets. A bracket 125ᵃ projecting from the side frame supports the cam plate 135. During the preliminary discharge of the pallets while the frames 114 are rounding the sprocket 77, the pallets rest on the cam surfaces 110ᵃ, normally a slight distance out of contact, and these maintain a rolling contact with the under side of the pallets, as indicated in Fig. 7 and support the pallets after the strips 101 have passed from supporting position. This serves to support the loaded pallets during the interval between the removal of the strips 101 from supporting position until engaged and supported by the take-off conveying mechanism. A supporting track 138 (see Fig. 7) carried by bracket 138ᵃ and having tapered ends, serves to support the roller and thereby the separating blades during tamping and troweling.

In the passage of the pallets toward the discharge end of the conveying mechanism, it is advisable to withdraw the separating blades 116 with a rubbing motion which smoothes one end of the tile. This preliminary partial withdrawal of the separating blade is illustrated for example in Fig. 7, where the flange 135ᵃ has effected a partial downward movement of the separating blade 116. At the same time, the tapered construction of the blade 116 results in a clearance between the following pallet and tile. It will be obvious that the pins 101ᵃ and strips 100, as they pass over the center of shaft 78, (see Fig. 7,) will increase the driving radius or leverage, thereby slightly accelerating the lateral movement of the pallets prior to clearance, which moves each pallet and tile slightly away from those following and in order to insure the wiping of the end by such separating blade it is desirable to have its partial downward movement occur before the acceleration of the pallet begins. For this purpose the flange 135ª is extended toward the front of the machine from the center of shaft 78, a distance slightly greater than the length of the pallet, or at least greater than that portion of the pallet from the engagement of the driving pins 101ª to the other end of the pallet.

At the discharge end of the main conveying mechanism is provided the take-off conveyor mechanism which comprises two main drums 150—151, see Figs. 7 and 8 for example. These drums are carried upon the rotatable shafts 150ª and 151ª suitably journaled. Extending rearwardly from the table of the main machine are the side bars 155 having the supporting legs 156. Slidably carried at the outer extremities at the bars 155 are the extensions 157 carrying the shaft 150ª. Extension of these extensions 157 is accomplished by means of the screws 158, as shown in Fig. 8, locking bolts 160 serving to maintain the extensions 157 in adjusted position.

This provides means for maintaining the proper tension on the conveyor belt 161 which extends around the pulleys 150.

Mounted upon the shaft 151ª is the sprocket pinion 165 driven by the chain 166 from sprocket 167 carried on shaft 78. A large driving sprocket 170 is also carried upon shaft 151ª and drives through the medium of chain 171, a smaller sprocket upon shaft 180, upon which is also carried the pinion 181, driving chain 182, which in turn drives sprocket 183 carried by shaft 184. Rollers 190 are carried upon shaft 180 and similar rollers 191 are carried upon shaft 184, the upper periphery of these rollers being tangential to the plane of the pallet bottom surface. This driving arrangement is preferably operated to rotate the rollers 190 and 191 at greater peripheral speed than that of the chains 179 of the main machine and these rolls are located so that the front end of each pallet will ride thereon and be supported and advanced by frictional contact until further contact and support is had from rollers 191, in which position the pallet is amply supported to prevent its tilting, and being moved at a greater speed than the former pallets, the gap between is widened sufficiently to prevent contact with the following tile. Each pallet is further advanced over the rolls 190—191 on to the conveyor belt 161, which conveys these pallets and tile to any suitable collection point.

Located just at the rear of the charging box 28 is the tamping member generally indicated by numeral 200. This tamping member is grooved or recessed on its under face to correspond to the transverse contour of the tile to be formed. This under surface is provided with curved portion 200ª of one arc, this constituting a smoothing and shaping portion, while the tail 200ᵇ is constructed eccentrically with its under surface 200ᶜ, of contour approximating an arc of a greater circle, as shown in Fig. 6 for example. A relatively flattened portion 200ᵈ unites these two curved portions. At the sides of the portion 200ª are the depending fins of flanges 200ˣ, partially overlying side plates 10ʳ (see Fig. 2ª), constructed and arranged to shape the sides of the tile. The tamper 200 is secured to the squared portion 201ª of the shaft 201 by bolts 202, or the like. Upstanding journal brackets 203 are provided, see Fig. 1, for example, and the shaft 201 is provided with cylindrical portions journaled in such brackets, see also Fig. 4. The shaft 201 extends through one of the brackets 203 and is provided with the crank arm 201ᵇ to which is pivotally attached one end of the connecting rod 205, see Figs. 2–4, the other end of the same being eccentrically mounted in the rotating disk 207, carried on shaft 208, which also carries pinion 209, driven by chain 210, which in turn is driven by sprocket 211 and shaft 82 as shown in Figs. 2 and 10. This construction imparts an oscillatory, or to and fro rotation to the tamping member 200. The tail, 200ᶜ of the tamping member is located adjacent the point of exit of the pallet from beneath the charging box 28, the gate 28ᵈ being normally adjusted to a point higher than the thickness of the tile, see Fig. 6. This results in an excess of the aggregate discharging upon the pallet boards as they emerge from beneath the gate 28ᵈ. The construction and motion of this tamping member serves then to pat or tamp the aggregate to the thickness and consistency desired, also to the approximate contour, further smoothing and shaping being accomplished by curved surface 200ª of the tamping member 200. The location of the partition 28ⁱ is such that too great an excess of aggregate is prevented from accumulating at the point of discharge beneath the gate 28ᵈ, which might result in a jamming or compacting of such aggregate with consequent breaking or interference with the operation of the mechanism. In short, this partition functions as a dam to prevent an excess of pressure and material at the gate 28ᵈ.

Located rearwardly of the charging and tamping mechanism, is provided the coloring mechanism shown for example in Figs. 2, 6, 12, 13. Suitable supports or standards 215 extend upwardly from the frame of the machine and support a tank 216 in which is maintained a supply of coloring, waterproofing or other material for application to the surface of the tile. A discharge tube or spout extends outwardly from the tank 246 at the bottom thereof over the table, see Fig. 12, for example, this tube being designated by numeral 217. Discharge ports 217ᵃ are provided in the bottom of the tube 217. Surrounding this tube is the rotatable sleeve 218 also having discharge ports 218ᵃ registrable with ports 217ᵃ. An operating handle 218ᵇ is attached to the outer extremity of the sleeve 218 to expedite its rotation or adjustment for discharge or cutoff. A perforated plunger 219 is mounted in the tube 217 with a rod 220 extending outside of the tube 217, see Fig. 12. Since the pigment or other material frequently used is viscous or dense, it is some times necessary to utilize the plunger to assist the discharge of the coating material by reciprocating it backward and forward.

Located beneath the tube 217 is the trough 225, see Fig. 6-13 for example. This trough is mounted between parallel supporting strips 226, an angle 226′ carried by the trough resting on the rear troweling member 227, thus limiting the downward movement of the trough which is removable, see Fig. 13. Troweling blocks 227 are provided, depending from and secured to the strips 226, the lower surface being recessed or grooved to conform to the contour of the tile. Additional securing and spacing blocks 227′ are provided at the sides of the trough 225 between the blocks 227. A slide 225′ having the looped end 225ᵃ engages the inclined rear wall 225ᵇ of the trough, see Fig. 6, for example. This slide 225 is movable to cut off or adjust the size of the discharge opening in the throat 225ᶜ of the trough 225′. Slidably mounted in the front wall 225ᵈ of the trough 225 is an adjustable plate 225ᵉ carrying at its bottom portion the blocks 240 tapered to conform to the grooves $C_1$, $C_2$ in the tile C. See Figs. 15 and 18. The blocks 227 are inclined slightly downwardly from front to rear and rounded at their forward edge at 227ᵉ, see Fig. 6, to exert a smoothing action on the tile running thereunder and to prevent cutting the same.

Located at each side of the table are the plates 245 carrying the upwardly projecting rods 245ᵃ with spacing bosses or collars 245ᵇ at the bottom thereof, see Fig. 13. Adjustably mounted on the rods 245ᵃ are the collars 246 provided with set-screws 247 to maintain such collars in adjusted position. Extending outwardly from the collars 246 are the ears 246ᵃ to each of which are pivotally attached parallel links 248—249, see Figs. 6–13. The parallel links 248—249 are pivoted at their outer ends to a vertical strip 246ᶜ. A bolt or rivet 246ᵈ extends through the ear 246ᵃ and the lower portion of the strip 246ᶜ, also through the end of the link 249. The corresponding end of link 248 is pivotally attached to the strip 246ᶜ and a locking screw 246ᵉ extends through an arcuate slot 246ᶠ in the ear 246ᵃ and engages the upper portion of 246ᶜ. This construction permits tilting adjustment of the strip 246ᶜ together with the link arms 248 and the supported troweling and coloring mechanism about the rivet 246ᵈ, a locking screw 246ᵉ serving to lock the mechanism in adjusted position. This permits the tilting of the troweling blocks within a limited range. The collar 245ᵇ is provided with the bearing plate 245ᶜ, which is intended to properly position and guide the lower link arms 249, insuring proper positioning of the troweling and coloring mechanism when the same is seated upon the stud 245ᵃ. Pivotally secured to the other ends of the links 248—249 are the plates 250, each having a flange 250ᵃ secured to the ends of strips 226. Set screws 228 provided with locking nuts 228ᵃ threadedly engage the strips 226 and rest upon the table strips 10ᵇ as shown in Figs. 12–13, for example. These set-screws serve to limit the approach of the blocks 227 and associated mechanism toward the table.

From the upper portion of the trough 225 leads an overflow gutter 260 having a downwardly inclined discharge portion 260ᵃ thereby providing means for removal of an excess of material from the trough 225.

When a tile and pallet has passed from beneath the tamping member 200, it is conveyed beneath the blocks 227, which serve to exert a further rubbing or troweling action upon the tile to smooth the same, one of the blocks contacting with the tile prior to discharge of the coloring matter thereon, and the other subsequently thereto, the latter block serving to force the coloring material into the surface of the tile. The location and construction of the trough containing such coloring material insures the maintenance of a coating upon the tile, the blocks 240 of gate 225ᵉ preventing the accumulation of an excess of fluid in the grooves of the tile. It is to be noted that the side walls of the trough 225 are extended downwardly at 225ˣ see Fig. 12, to close contact with the sides of the tile to prevent excessive leakage of the coloring material.

The means of supporting and mounting this coating and troweling mechanism is in effect a parallel link motion, which latter permits the rise of the blocks 227, trough 225, etc. should a tile passing thereunder be of slightly greater thickness than normal. The supporting studs 228 may be adjusted to permit the weight of this mechanism to be exerted upon the tile passing thereunder to exert a desirable compression. The parallel link motion insures vertical and not rotative movement of the blocks 227, so that their lower surfaces will not rotate during vertical movement, thereby eliminating any possibility of cutting or gouging of the tile.

It is believed that the operation of my machine should be clear to those skilled in the art from the preceding description, but to summarize briefly, the operation is as follows:

Empty pallets are placed or otherwise fed to the front of the table and picked up by the conveyor chains and strips, and passed beneath the charging box 28. During the travel beneath and through the charging box a load of aggregate is picked up by the pallet and the same is tamped and troweled to the proper thickness and consistency by the member 200, after which the tile passes beneath the coloring apparatus during which it receives a further smoothing or troweling and a coat of coloring or other material. Preferably the tile are tamped to a thickness just covering the upper edges of the separating blades 116 so that a continuous tile surface is maintained from the hopper to the point of acceleration of the pallets. This results in a smooth application of coloring and smooth surfaced tile, which readily separate at the blades when the pallets are accelerated, thus leaving smooth square ends. After passing the coloring apparatus, the separating blades are partially dropped and subsequently entirely removed from interference with the end of the pallet, after which it is passed from the auxiliary conveying rolls 190—191 and by such rolls carried upon the conveyor belt 161, after which it is moved to any desired collection point.

It will be apparent that my machine is susceptible of modification and improvement and I do not wish to be restricted to the form shown and described, except as defined in the appended claims.

What I claim is—

1. In mechanism of the class described, sprockets, endless chains engaging said sprockets, cross members carried by said chains, said cross members being spaced apart to support the pallets adjacent the ends of the latter, and separating members carried by said conveyor chains and provided with portions movable into and out of position between the ends of adjacent pallets.

2. In mechanism of the class described, conveyor chains, cross strips carried thereby, separating members also carried thereby and having blade portions normally extending between adjacent pairs of strips.

3. In mechanism of the class described, conveyor chains, cross strips carried thereby, separating members also carried thereby and having blade portions normally extending between adjacent pairs of strips, and means to yieldingly maintain said blade portions in separating position.

4. In mechanism of the class described, conveyor chains, cross strips carried thereby, separating members also carried thereby and having blade portions normally extending between adjacent pairs of strips, and means to move said blade members out of separating position.

5. In mechanism of the class described, a frame, conveyor chains movable with respect to said frame, cross strips carried by said chains, separating members supported by and movable with said chains, said members being provided with separating blades movable into and out of separating position between adjacent pairs of strips, cam tracks, engaging means carried by said separating members coactable with said tracks to move said blades into and out of separating position.

6. In mechanism of the class described, a frame, conveyor chains movable with respect to said frame, cross strips carried by said chains, separating members supported by and movable with said chains, said members being provided with separating blades movable into and out of separating position between adjacent pairs of strips, cam tracks, said separating members being provided with engaging means engageable with said cam tracks the latter being constructed and arranged to move said blades into and out of separating position.

7. In mechanism of the class described, spaced frame members, conveyor chains movable therebetween, pallet supporting cross strips located in pairs across said chains the strips of each pair being spaced, third strips extending across said chains and separating members carried by said third strips, said separating members being provided with blades movable into and out of position between the strips of each pair.

8. In mechanism of the class described, spaced frame members, conveyor chains movable therebetween, pallet supporting cross strips located in pairs across said chains the strips of each pair being spaced, third strips extending across said chains and separating members carried by said third strips, said separating members being provided with blades movable into and out of position between the strips of each pair, spring means coacting with each of said separating members to yieldingly maintain said separating members in separating position.

9. In mechanism of the class described, conveyor chains, pallet supporting strips extending thereacross, other strips located between said pallet supporting strips, separating mechanism carried by said other strips and comprising pivotally mounted frames, separating blades carried by said frames.

10. In mechanism of the class described, conveyor chains, pallet supporting strips extending thereacross, other strips located between said pallet supporting strips, separating mechanism carried by said other strips and comprising pivotally mounted frames, separating blades carried by said frames, cam tracks, said separating frames being provided with projections, rollers carried thereby and engageable with said tracks.

11. In mechanism of the class described, in combination, pallet supporting and conveying mechanism, separating members carried thereby and comprising separating blades movable into and out of position between pairs of adjacent pallets, said blades being mounted for arcuate travel.

12. In mechanism of the class described, in combination, pallet supporting and conveying mechanism, separating members carried thereby and comprising separating blades movable into and out of position between pairs of adjacent pallets, said blades being mounted for arcuate travel, the center of said travel being located below the plate of travel of said pallets.

13. In mechanism of the class described, separating blades having a plane face and a curved face, said faces intersecting to form an edge.

14. In mechanism of the class described, a separating member comprising a blade having a plane rear surface and a curved forward surface, said surfaces intersecting to form an edge.

15. In mechanism of the class described, a separating member comprising a blade movable in an arcuate path, said blade having a plane surface and a curved surface.

16. In mechanism of the class described, a separating member comprising a blade movable in an arcuate path, said blade having a plane surface and a curved surface, said surfaces being located above the center of arcuate movement when in normal position.

17. In mechanism of the class described, a separating member comprising a blade movable in an arcuate path, said blade having a plane surface and a curved surface, said surface being located above the center of arcuate movement when in normal position, the radius of curvature of said curved faces being less than the radius of arcuate movement.

18. In mechanism of the class described, pallet supporting strips, intermediate strips located therebetween, brackets carried by said intermediate strips, frames pivotally attached to each bracket, and separating blades carried by said frames.

19. In mechanism of the class described, a conveyor comprising chains and pallet supporting cross strips, said conveyor being provided with pallet supporting means intermediate said supporting strips.

20. In mechanism of the class described, a conveyor comprising chains and pallet supporting cross strips, said conveyor being provided with pallet supporting lugs intermediate said supporting strips, said lugs being cam surfaced to provide rolling contact for the pallets to maintain the latter in the proper plane of travel when said chains are rounding a sprocket.

21. In a machine of the class described, spaced frame members, conveyor mechanism comprising sprockets, chains extending therearound and movable between said frame members, a charging hopper located above said conveyor mechanism, separating members carried by said conveyor, said separating members being each provided with an engageable portion, cam tracks located between said frame members and engageable with said portion of said separating members.

22. In a machine of the class described, spaced frame members, conveyor mechanism comprising sprockets, chains extending therearound and movable between said frame members, a charging hopper located above said conveyor mechanism, separating members carried by said conveyor, said separating members being provided with an engageable portion, cam tracks located between said frame members and engageable with said portion of said separating members, one of said tracks being arranged in advance of said hopper and constructed to move said separating members out of separating position and thereafter into separating position prior to passage beneath said hopper.

23. In mechanism of the class described, pallet supporting and conveying mechanism, and means carried by said conveyor means to support and engage the pallets, said means being constructed and arranged to accelerate the speed of such pallets adjacent their point of discharge from said conveyor.

24. In mechanism of the class described, pallet supporting and conveying means comprising spaced supporting members to support pallets adjacent the ends thereof, intermediate supporting members located between said first intermediate members and supporting said pallets during passage thereof from said conveying means.

25. In mechanism of the class described, pallet supporting and conveying means, and a rolling support for said pallets moving with said conveyor and operable during the discharge of the pallets therefrom to support the same intermediate their extremities by rolling contact.

26. In mechanism of the class described, pallet supporting and conveyor means comprising endless chains, and sprockets, said chains being mounted on said sprockets, a supporting cam carried by said chains beneath said pallets, said cams being operable to support such pallets as said chain passes over said sprocket.

27. In mechanism of the class described, a pallet supporting and conveyor means comprising endless chains and sprockets, said chains being mounted on said sprocket, a supporting cam carried by said chains beneath said pallets, the upper surface of said cam being substantially concentric with said sprockets.

28. In mechanism of the class described, a pallet supporting and conveyor means, comprising endless chains and sprockets, said chains being carried on said sprockets, a cam carried by said chains above the plane of the upper run thereof, beneath a pallet carried on said chain, said cam being provided with a cam surface arranged to support a superimposed pallet as said chain passes over said sprocket and to accelerate the movement of said pallet while rounding said sprocket.

29. In mechanism of the class described, in combination a conveyor mechanism, pallet engaging and supporting means carried thereby, a charging hopper located above said conveying means, the ends of said hopper being spaced from such conveying means to permit the passage of the pallets beneath said hopper, and a partition in said hopper intermediate the point of entrance and exit of said pallets.

30. In mechanism of the class described, in combination a conveyor mechanism, pallet engaging and supporting means carried thereby, a charging hopper located above said conveying means, the ends of said hopper being spaced from such conveying means to permit the passage of the pallets beneath said hopper, and a partition in said hopper intermediate the point of entrance and exit of said pallets, said partition being vertically adjustable.

31. In mechanism of the class described, in combination a conveyor mechanism, pallet engaging and supporting means carried thereby, a charging hopper located above said conveying means, the ends of said hopper being spaced from such conveying means to permit the passage of the pallets beneath said hopper, an adjustable member at the exit end of said hopper to adjust the height of the material conveyed therefrom by said pallets, and a partition in said hopper intermediate the points of entrance and exit of said pallets.

32. In mechanism of the class described, in combination a conveyor mechanism, pallet engaging and supporting means carried thereby, a charging hopper located above said conveying means, the ends of said hopper being spaced from such conveying means to permit the passage of the pallets beneath said hopper, an adjustable member at the exit end of said hopper to adjust the height of the material conveyed therefrom by said pallets, and a partition in said hopper intermediate the points of entrance and exit of said pallets, said partition being vertically adjustable.

33. In mechanism of the class described, in combination a conveyor mechanism, pallet engaging and supporting means carried thereby, a charging hopper located above said conveying means, the ends of said hopper being spaced from such conveying means to permit the passage of the pallets beneath said hopper, an adjustable member at the exit end of said hopper to adjust the height of the material conveyed therefrom by said pallets, and a partition in said hopper intermediate the points of entrance and exit of said pallets, said partitions being operably attached to said adjustable member for vertical adjustment therewith.

34. In mechanism of the class described, a pallet supporting and moving conveyor, a charging hopper located thereabove, said hopper being provided with an entrance and exit for pallets carried by said conveyor, and a tamping member located adjacent the exit of said hopper and having a tamping portion arranged to tamp and shape the material deposited on such pallets in the hopper as the pallets emerge therefrom, said tamping member being provided with fins at the sides thereof to shape and smooth the lateral faces of the material on said pallets.

35. In mechanism of the class described, a pallet supporting and moving conveyor, a charging hopper located thereabove, said hopper being provided with an entrance and exit for pallets carried by said conveyor, a tamping member located adjacent the exit of said hopper and having a tamping portion arranged to tamp and shape the material deposited on such pallets in the hopper as the pallets emerge therefrom, said tamping member being mounted for oscillation about a center, the tamping portion of said member being eccentric with respect to said center, and side extensions located at the rear end of said hopper to confine the material deposited on the pallets passing therethrough during the tamping of said material.

36. In mechanism of the class described, a pallet supporting and moving conveyor, a charging hopper located thereabove, said hopper being provided with an entrance and exit for pallets carried by said conveyor, a tamping member located adjacent the exit of said hopper and having a tamping portion arranged to tamp and shape the material deposited on such pallets in the hopper as the pallets emerge therefrom, said tamping member being mounted for oscillation about a center, the tamping portion of said member being eccentric with respect to said center and side extensions located at the rear end of said hopper to confine the material deposited on the pallets passing therethrough during the tamping of said material, said tamping member being provided with concentric fins at the sides thereof rearwardly of said side extensions of the hopper to shape and smooth the sides of the material carried on said pallets.

37. In mechanism of the class described, a tamping member, means to pivotally support such member for oscillatory movement, said member being provided with a concentric smoothing portion and an eccentric tamping portion, said tamping member being further provided with fins to shape the sides of a tile.

38. In mechanism of the class described, a tamping member, means to pivotally support such member for oscillatory movement, said member being provided with a concentric smoothing portion and an eccentric tamping portion, said tamping member being further provided with concentric fins depending from the concentric portion to shape the sides of a tile or the like, and means to oscillate said tamping member about its pivotal support.

39. In mechanism of the class described, an open bottomed charging hopper having an exit for charging pallets, a tamping member having a tamping portion located outside of and adjacent the said point of exit and means to regulate the size of said exit and thereby the amount of material emerging therefrom on a pallet or the like, plates extending rearwardly of the hopper on either side of said tamping member to confine the material on said pallets during the tamping thereof.

40. In mechanism of the class described, a charging hopper having an exit for charged pallets, a tamping member having a tamping portion located adjacent the said point of exit and means to regulate the size of said exit and thereby the amout of material emerging therefrom on a pallet or the like, plates extending rearwardly of the hopper on either side of said tamping member to confine the material on said pallets during the tamping thereof, said tamping member being provided with shaping fins at the sides thereof overlying portions of said extensions.

41. In mechanism of the class described, pallet supporting and conveying means, troweling means comprising a troweling member and means to support the same, said last named means being constructed and arranged to permit vertical non-rotary movement of said troweling member.

42. In mechanism of the class described, a troweling means comprising a troweling member, a support therefor, and a parallogram mechanism for attachment of said troweling member to said support to permit vertical non-rotary movement of said member.

43. In mechanism of the class described, troweling means comprising a troweling member, attaching means therefor to permit vertical non-rotary movement of said troweling member, and means to angularly adjust the position of said troweling member.

44. In mechanism of the class described, a post, a troweling member, means to attach said troweling member to said post, said means comprising a collar having a flanged portion and parallel links pivotally attached to said troweling member to permit vertical movement of the latter.

45. In mechanism of the class described, a post, a collar apertured to engage said post, said collar being provided with a flange, a plate attached to said flange, and angularly adjustable with respect thereto, parallel arms pivoted to said plate, and a troweling member, brackets attached thereto, said parallel links being also pivotally attached to said brackets.

46. In mechanism of the class described, troweling means comprising fixed posts, collars apertured to engage said posts, flanges carried by said collars, a pair of spaced troweling members, brackets connecting said troweling members, and parallel links pivotally attached to and extending between said brackets and said collar flanges.

47. In mechanism of the class described, a vertically movable troweling member, a trough located rearwardly of said troweling member and movable therewith, said trough being open at the bottom.

48. In mechanism of the class described, a vertically movable troweling member, a trough located rearwardly of said troweling member and movable therewith, said trough being open at the bottom, and means to regulate the discharge of coloring material, from said trough.

49. In mechanism of the class described, a vertically movable troweling member, a trough located rearwardly of said troweling member and movable therewith, said trough being open at the bottom, and means to regulate the discharge of coloring material or the like from said trough, said last named means comprising a slidable gate.

50. In mechanism of the class described, a trough having an open bottom constructed to conform to the profile of a tile passing therebeneath, the front and back of said trough at the bottom thereof having depending portions to ride in depressions in such tile, and a vertically adjustable plate, blocks carried by said plate adapted to move into or out of depressions in such tile to substantially fill the same.

51. In mechanism of the class described, a pair of spaced troweling members, a trough located therebetween and being open at the bottom to discharge coloring material upon a tile passing therebeneath.

52. In mechanism of the class described, in combination, tile supporting means, means to maintain a confined body of fluid material upon said tile, means to move said tile relative to said fluid body for coating.

53. In mechanism of the class described, in combination, tile supporting means, means to maintain a confined body of fluid coloring material upon said tile, and means to move said tile relative to said fluid body to color the same.

54. In mechanism of the class described, in combination, tile supporting means, means to maintain a confined body of fluid coloring material upon said tile, means to move said tile relative to said fluid body to color the same, and means to restrict the amount of coloring material deposited upon said tile.

55. In mechanism of the class described, in combination, tile supporting means, means to maintain a body of fluid coloring material upon said tile, means to move said tile relative to said fluid body to color the same, and troweling means coacting with said coloring means.

56. In mechanism of the class described, a pair of spaced troweling members, a trough located therebetween and being open at the bottom to discharge coloring material or the like upon a tile passing therebeneath, said trough and troweling members being mounted for vertical movement on such tile.

57. In mechanism of the class described, a pair of spaced troweling members, a hopper located therebeneath and open at the bottom, said hopper and troweling members being mounted for vertical movement and being recessed at the bottom to conform to the profile of the tile passing therebeneath.

58. In mechanism of the class described, a pair of spaced troweling members, a hopper located therebeneath and open at the bottom, said hopper and troweling members being mounted for vertical movement and being recessed at the bottom to conform to the profile of the tile passing therebeneath, said troweling members being downwardly inclined from front to rear.

59. In mechanism of the class described, a pair of spaced troweling members, a hopper located therebeneath and open at the bottom, said hopper and troweling members being mounted for vertical movement and being recessed at the bottom to conform to the profile of the tile passing therebeneath, said troweling members being downwardly inclined from front to rear and being rounded at their forward lower edge.

60. In mechanism of the class described, pallet conveying means comprising chains and sprockets, pallet supporting strips extending across and carried by said chains, said strips being mounted in pairs the members of each pair being spaced, one strip of each pair being provided with pallets engaging means, means to charge the pallets with material, means to form said material into a tile or the like, separating members carried by said conveyor, said members being provided with blades movable into separating position between each pair of supporting strips, means to accelerate the pallets in succession as the same approach the discharge end of the conveying mechanism.

61. In mechanism of the class described, pallet conveying means comprising chains and sprockets, pallet supporting strips extending across and carried by said chains, said strips being mounted in pairs the members of each pair being provided with pallet engaging means, means to charge the pallets with material, means to form the material, means to form the material into tile, separating members carried by said conveyor, said members being spaced, one strip of each pair being provided with material, means to form said material into a tile, separating members carried by said conveyor, said members being provided with blades movable into separating position between each pair of supporting strips, means to accelerate each pallet in succession as it approaches the discharge end of the conveying mechanism, and means to depress the preceding separating blade prior to such acceleration.

62. In mechanism of the class dscribed, pallet conveying means comprising chains and sprockets, pallet supporting strips extending across and carried by said chains, said strips being mounted in pairs the members of each pair being spaced, one strip of each pair being provided with material, means to form said material into a tile, separating members carried by said conveyor, said members being provided with blades movable into separating position between each pair of supporting strips, and means intermediate the ends of each pallet for supporting the same as the forward of the strips supporting such pallet rounds the sprocket at the discharge end of the conveying mechanism.

63. In mechanism of the class described, pallet conveying means comprising chains and sprockets, pallet supporting strips extending across and carried by said chains, said strips being mounted in pairs the members of each pair being spaced, one strip of each pair being provided with pallet engaging means, means to charge the pallets with material, means to form the material, means to form the material into tile, separating members carried by said conveyor, said members being provided with material, means to form said material into a tile, separating members carried by said conveyor, said members being provided with blades movable into separating position between each pair of supporting strips, and means intermediate the ends of each pallet for supporting the same as the forward of the strips supporting such pallet rounds the sprocket at the discharge end of the conveying mechanism, said last named means being constructed and arranged to provide a rolling contact with the pallets as the intermediate supporting means is rounding such sprockets.

64. A process of making concrete tile consisting in forming said tile, and passing the same beneath and submitting the surface thereof to a confined body of fluid coloring material.

65. A process of making concrete tile consisting in forming said tile, and passing the same beneath and submitting the surface thereof, to a confined body of fluid coloring material, and thereafter trowelling the colored surface.

66. A process of making concrete tile consisting in first forming the tile, thereafter passing said freshly formed tile beneath and subjecting the same to the action of a superimposed confined body of fluid coloring material.

67. A process of making concrete tile consisting in forming said tile, thereafter trowelling the exposed surface thereof, and thereafter moving said tile relative to and subjecting the same to the action of a superimposed confined fluid body of coloring material.

68. A process of making concrete tile consisting in forming said tile, thereafter trowelling the exposed surface thereof, and thereafter moving said tile relative to and subjecting the same to the action of a superimposed confined fluid body of coloring material, and subsequently trowelling the colored surface.

69. A process of making concrete tile consisting in superimposing a confined fluid body of coloring material upon the surface of said tile, and thereafter trowelling the same.

In testimony whereof, I have subscribe my name.

CLAUS O. BRANDELL.